Figure 1:
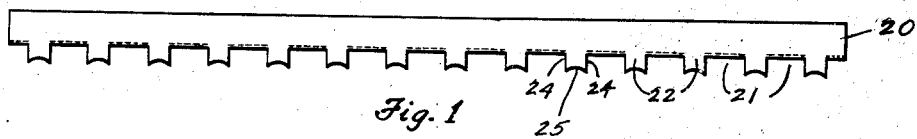

Sept. 6, 1927.

R. M. CRITCHFIELD 1,641,414

METHOD OF MANUFACTURING COMMUTATORS

Filed Dec. 13, 1924

Inventor
Robert M. Critchfield

By Spencer Small and Hardman
his Attorneys

Patented Sept. 6, 1927.

1,641,414

UNITED STATES PATENT OFFICE.

ROBERT M. CRITCHFIELD, OF ANDERSON, INDIANA, ASSIGNOR, BY MESNE ASSIGNMENTS, TO DELCO-REMY CORPORATION, OF DAYTON, OHIO, A CORPORATION OF DELAWARE.

METHOD OF MANUFACTURING COMMUTATORS.

Application filed December 13, 1924. Serial No. 755,810.

This invention relates to commutators and the manufacture thereof, and more particularly to small commutators such as are used in small electric motors for motor-operated automobile horns.

The objects of the invention are to simplify and improve the construction of commutators of this type whereby to reduce the cost of manufacture.

Further objects and advantages of the present invention will be apparent from the following description, reference being had to the accompanying drawings, wherein a preferred form of the present invention is clearly shown.

Figure 2:
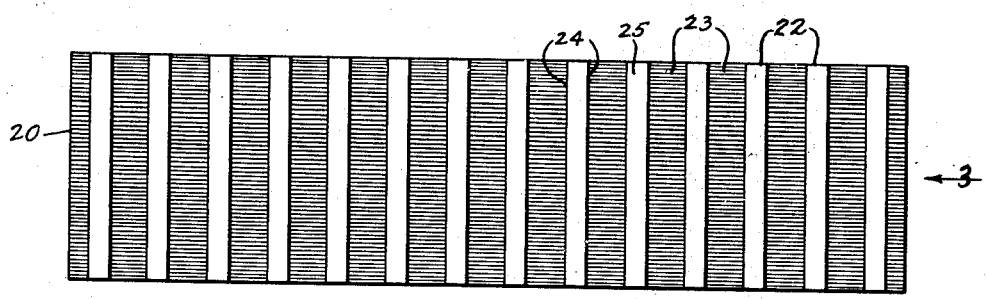
Figure 3:
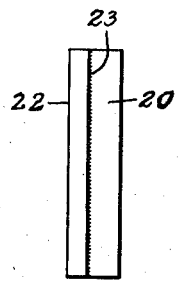
Figure 4:
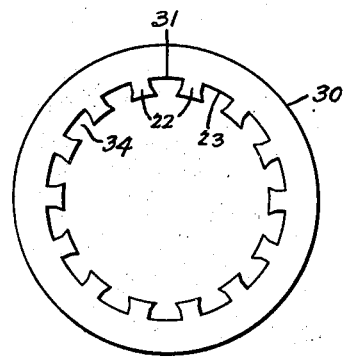
Figure 5:
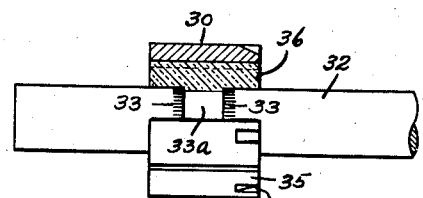
Figure 6:
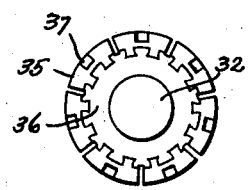

In the drawings:

Fig. 1 is an edge view of a previously formed strip of copper or other conducting material used in the manufacture of commutators according to the present invention; Fig. 2 is a plan view thereof; Fig. 3 is an end view in the direction of arrow 3 in Fig. 2; Fig. 4 is an end view of a ring constructed of metal shown in Figs. 1, 2 and 3; Fig. 5 is a view partly in longitudinal section showing a commutator constructed in accordance with the present invention; and Fig. 6 is an end view of the commutator and shaft shown in Fig. 5. Figs. 1 to 4 are drawn on a larger scale than Figs. 5 and 6, in order to show more clearly certain novel features.

Referring to the drawings, the commutators are constructed from predetermined lengths of malleable, ductile metal of good electrical conductivity shown in Figs. 1, 2 and 3. This material is formed by providing a bar 20 of copper with a plurality of parallel grooves 21 which space a plurality of tangs, 22. The surfaces 23 of the bar between the tangs 22 are corrugated or ribbed in a direction parallel to the long dimension of the bar 20, or transversely to the side surfaces 24 of the tangs. The side surfaces 24 are substantially plane and parallel, and the faces 25 of the tangs are concave.

The bar 20 is formed into a cylinder 30, the end view of which is shown in Fig. 4, the meeting edges of the metal abutting as indicated by the line 31, but not bonded. The cylinder is formed by bending the bar 20 around the cylindrical form or mandrel. This operation causes the concave surfaces 25 of the tangs 22 to be rendered more nearly plane thus causing the tangs 22 to be rendered dove-tailed shape in cross section. A central support or shaft 32 for supporting the commutator is provided with a knurled portion 33 and a groove 33ª. The cylinder 30 and shaft 32 are placed in a mold having means for maintaining the shaft and cylinder in concentric relation and the knurls 33 and groove 33ª within the cylinder 30. A quantity of molding material such as bakelite molding powder is tamped into the space in the mold between the cylinder 30 and the shaft 32. The molding material is subjected to heat and pressure to cause it to take a permanent form and to flow sufficiently to fill the spaces 34 of the cylinder 30 between the dove-tail tangs 22, the spaces between the ribs or corrugations of the surfaces 23 and the spaces provided by the knurls 33 and groove 33ª of the shaft 32. In this manner, cylinder 30 is firmly anchored to the shaft 32.

The next operation is to separate the cylinder 30 lengthwise into segments. This is done preferably by sawing the metal, one of the saw cuts being taken through the abutting surfaces of the cylinder as indicated by line 31. This operation divides the cylinder into a plurality of segments 35 anchored to a body 36 of molded material which in turn is anchored to the shaft 32. Each segment 35 is provided with a notch 37 for receiving a lead from an armature coil (not shown), the armature being also mounted on the shaft 32.

While the form of embodiment of the invention as herein disclosed, constitutes a preferred form, it is to be understood that other forms might be adopted, all coming within the scope of the claims which follow.

What is claimed is as follows:

1. The method of making a commutator which includes making a metal cylinder having inwardly projecting spaced tangs extending longitudinally of the cylinder, in locating a support centrally of the cylinder and spaced therefrom, in joining the support and tangs by a non-conducting hardenable plastic material, and in separating the cylinder longitudinally into segments to provide an annulus of insulated metal bars.

2. The method of making a commutator which includes making a metal cylinder having inwardly projecting spaced tangs, dovetail-shape in transverse section and extending longitudinally of the cylinder, in locating a support centrally of the cylinder and spaced therefrom, in joining the support and tangs by a non-conducting hardenable plastic material, and in separating the cylinder longitudinally into segments to provide an annulus of insulated metal bars.

3. The method of making a commutator which includes forming a flat bar of metal with a plurality of spaced parallel tangs, in bending the bar into a cylinder with meeting edges abutting and in deforming the faces of the tangs transversely so that the face will be wider than the width of the tang adjacent the main portion of the cylinder, in locating a support centrally of the cylinder and spaced therefrom, in joining the support and tangs by a non-conducting hardenable plastic material, and in separating the cylinder longitudinally into segments to provide an annulus of insulated metal bars.

4. The method of making a commutator which includes forming a flat bar of metal with a plurality of spaced parallel tangs, the faces of the tangs being concave, in bending the bar into a cylinder with meeting edges abutting and in forming the faces of the tangs more nearly plane so that the face will be wider than the width of the tang adjacent the main portion of the cylinder, in locating a support centrally of the cylinder and spaced therefrom, in joining the support and tangs by a non-conducting hardenable plastic material, and in separating the cylinder longitudinally into segments to provide an annulus of insulated metal bars.

5. Material for making commutators, consisting of a bar of ductile metal of good electrical conductivity grooved on one side to provide parallel tangs having concave faces.

6. Material for making commutators, consisting of a bar of ductile metal of good electrical conductivity grooved on one side to provide parallel tangs, the surfaces of the bar between the tangs being provided with ridges transverse to the side walls of the tangs.

In testimony whereof I hereto affix my signature.

R. M. CRITCHFIELD.